United States Patent
Wang et al.

(10) Patent No.: US 11,683,498 B2
(45) Date of Patent: Jun. 20, 2023

(54) HARDWARE PIPELINES FOR RATE-DISTORTION OPTIMIZATION (RDO) THAT SUPPORT MULTIPLE CODECS

(71) Applicant: Meta Platforms, Inc., Menlo Park, CA (US)

(72) Inventors: Zhao Wang, Newark, CA (US); Srikanth Alaparthi, Fremont, CA (US); Yunqing Chen, Los Altos, CA (US); Baheerathan Anandharengan, Milpitas, CA (US); Gaurang Chaudhari, Sunnyvale, CA (US); Junqiang Lan, Fremont, CA (US); Harikrishna Madadi Reddy, San Jose, CA (US); Prahlad Rao Venkatapuram, Saratoga, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/586,829

(22) Filed: Jan. 28, 2022

(65) Prior Publication Data

US 2023/0048150 A1 Feb. 16, 2023

Related U.S. Application Data

(60) Provisional application No. 63/232,944, filed on Aug. 13, 2021.

(51) Int. Cl.
*H04N 19/147* (2014.01)
*H04N 19/124* (2014.01)
(Continued)

(52) U.S. Cl.
CPC ......... *H04N 19/147* (2014.11); *H04N 19/122* (2014.11); *H04N 19/124* (2014.11);
(Continued)

(58) Field of Classification Search
CPC .. H04N 19/147; H04N 19/122; H04N 19/124; H04N 19/154; H04N 19/172;
(Continued)

(56) References Cited

U.S. PATENT DOCUMENTS

| 6,192,032 B1 | 2/2001 | Izquierdo |
| 9,118,918 B2 | 8/2015 | Huang et al. |

(Continued)

FOREIGN PATENT DOCUMENTS

CN    112422986 A    2/2021

OTHER PUBLICATIONS

C. Zhu, H. Jia, S. Zhang, X. Huang, X. Xie and W. Gao, "On a Highly Efficient RDO-Based Mode Decision Pipeline Design for AVS," in IEEE Transactions on Multimedia, vol. 15, No. 8, pp. 1815-1829, Dec. 2013, doi: 10.1109/TMM.2013.2280446.*

(Continued)

*Primary Examiner* — Mohammed S Rahaman
(74) *Attorney, Agent, or Firm* — Greenberg Traurig, LLP

(57) ABSTRACT

A disclosed system may include a hardware distortion data pipeline that may include (1) a quantization module that generates a quantized data set, (2) an inverse quantization module that generates, from the quantized data set, an inverse quantized data set by executing an inverse quantization of the quantized data set, and (3) an inverse transformation module that generates an inversely transformed data set by executing an inverse transformation of the inverse quantized data set. The system may also include a hardware determination pipeline that determines a distortion metric based on the inversely transformed data set and the residual frame data set, and a hardware token rate pipeline that determines, based on the quantized data set, a token rate for an encoding of the residual frame data set via a video (Continued)

encoding pipeline. Various other methods, systems, and computer-readable media are also disclosed.

20 Claims, 7 Drawing Sheets

(51) Int. Cl.
| | |
|---|---|
| *H04N 19/172* | (2014.01) |
| *H04N 19/122* | (2014.01) |
| *H04N 19/186* | (2014.01) |
| *H04N 19/436* | (2014.01) |
| *H04N 19/154* | (2014.01) |
| *H04N 19/423* | (2014.01) |
| *H04N 19/625* | (2014.01) |

(52) U.S. Cl.
CPC ......... *H04N 19/154* (2014.11); *H04N 19/172* (2014.11); *H04N 19/186* (2014.11); *H04N 19/423* (2014.11); *H04N 19/436* (2014.11); *H04N 19/625* (2014.11)

(58) Field of Classification Search
CPC .. H04N 19/186; H04N 19/423; H04N 19/436; H04N 19/625
See application file for complete search history.

(56) References Cited

U.S. PATENT DOCUMENTS

| | | |
|---|---|---|
| 9,432,676 B2 | 8/2016 | Zhou |
| 9,794,575 B2 | 10/2017 | Pearson |
| 10,356,440 B2 | 7/2019 | Mishra et al. |
| 2003/0156652 A1* | 8/2003 | Wise ................. G06F 13/16 711/E12.003 |
| 2012/0230397 A1 | 9/2012 | Ouedraogo et al. |
| 2016/0100193 A1 | 4/2016 | Mishra et al. |
| 2018/0152732 A1* | 5/2018 | Chen ................. H04N 19/423 |
| 2021/0006792 A1* | 1/2021 | Han ................. H04N 19/186 |
| 2022/0021891 A1* | 1/2022 | Chaudhari ....... H04N 21/23439 |

OTHER PUBLICATIONS

Chuang Zhu, Yuan Li, Hui-zhu Jia, Xiao-dong Xie and Hai-bing Yin, "A highly efficient pipeline architecture of RDO-based mode decision design for AVS HD video encoder," 2011 IEEE International Conference on Multimedia and Expo, 2011, pp. 1-6, doi: 10.1109/ICME.2011.6011975.*

Kianfar D., et al., "Parallelized Rate-Distortion Optimized Quantization Using Deep Learning," Retrieved from Internet: https://arxiv.org/pdf/2012.06380V1, Dec. 11, 2020, 6 pages.*

International Search report and Written Opinion for International Application No. PCT/US2022/040274, dated Nov. 16, 2022, 12 pages.

Tu Y-K et al., "Efficient Rate-Distortion Estimation for H.264/AVC Coders," IEEE Transactions on Circuits and Systemsfor Video Technology, vol. 16, No. 5, May 1, 2006, pp. 600-611.

Wang T., et al., "A Real-Time Rate Control Scheme and Hardware Implementation for H.264/AVC Encoders," Image and Signal Processing (CISP), 2012 5th International Congress on Image and Signal Processing, Oct. 16, 2012, pp. 5-9.

* cited by examiner

Method 300

```
                    ┌─────────┐
                    │  Start  │
                    └────┬────┘
                         ▼
```

Generate, within a distortion data pipeline, a quantized (Q) data set based on a picture parameter set (PPS) and a transformed (TX) data set, the TX data set comprising a residual frame data set that has been transformed in accordance with a transformation operation
310

Generate, within the distortion data pipeline, an inverse quantized (IQ) data set by executing an inverse quantization of the Q data set
320

Generate, within the distortion data pipeline, an inversely transformed (ITX) data set by executing an inverse transformation of the IQ data set
330

Determine, within a determination pipeline, a distortion metric based on the ITX data set and the residual frame data set
340

Determine, within a token rate pipeline, based on the Q data set, a token rate for an encoding of video data via a video encoding pipeline
350

```
                    ┌─────────┐
                    │   End   │
                    └─────────┘
```

| Partition | H.264 (Width × Depth) | VP9 (Width × Depth) |
|---|---|---|
| Inter 4 × 4 | DCT4 | DCT4 |
| Inter 8 × 8 | DCT8 | DCT8 |
| Inter 16 × 16 | DCT4 | DCT16 |
| Inter 32 × 32 | - | DCT32 |
| Intra 4 × 4 | DCT4 | DCT4, DST4 |
| Intra 8 × 8 | DCT8 | DCT8, DST8 |
| Intra 16 × 16 | DCT4 | DCT16, DST16 |

ITX (ITX0, ITX1)

| Partition | H.264 (Width × Depth) | VP9 (Width × Depth) |
|---|---|---|
| Inter 4 × 4 | IDCT4 | IDCT4 |
| Inter 8 × 8 | IDCT8 | IDCT8 |
| Inter 16 × 16 | IDCT4 | IDCT16 |
| Inter 32 × 32 | - | IDCT32 |
| Intra 4 × 4 | IDCT4 | IDCT4, IDST4 |
| Intra 8 × 8 | IDCT8 | IDCT8, IDST8 |
| Intra 16 × 16 | DCT4 | IDCT16, IDST16 |

Ping-Pong Buffers

| Partition | H.264 | VP9 |
|---|---|---|
| Inter 4 × 4 | 16 pixels × 2 rows | 16 pixels × 2 rows |
| Inter 8 × 8 | 16 pixels × 8 rows | 16 pixels × 8 rows |
| Inter 16 × 16 | 16 pixels × 2 rows | 16 pixels × 32 rows |
| Inter 32 × 32 | - | 32 pixels × 64 rows |
| Intra 4 × 4 | 16 pixels × 2 rows | 16 pixels × 2 rows |
| Intra 8 × 8 | 16 pixels × 8 rows | 16 pixels × 8 rows |
| Intra 16 × 16 | 16 pixels × 2 rows | 16 pixels × 32 rows |

| FIFO Buffers | | |
|---|---|---|
| Partition | H.264 (Width × Depth) | VP9 (Width × Depth) |
| Inter 4 × 4 | 258 × 16 | 258 × 16 |
| Inter 8 × 8 | 257 × 16 | 257 × 16 |
| Inter 16 × 16 | 513 × 39 | 513 × 39 |
| Inter 32 × 32 | 353 × 128 | 352 × 128 |
| Intra 4 × 4 | 258 × 16 | 258 × 16 |
| Intra 8 × 8 | 257 × 16 | 257 × 16 |
| Intra 16 × 16 | 513 × 39 | 513 × 39 |

*FIG. 7*

HARDWARE PIPELINES FOR RATE-DISTORTION OPTIMIZATION (RDO) THAT SUPPORT MULTIPLE CODECS

CROSS REFERENCE TO RELATED APPLICATION

This application claims the benefit of U.S. Provisional Patent Application 63/232,944, filed Aug. 13, 2021, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3 is a flow diagram of an example method for RDO via a hardware pipeline as described herein.

FIG. 4 is a table that describes various transform operations that may be included as part of one or more hardware pipelines as described herein.

FIG. 5 is a table that describes various inverse transform operations that may be included as part of one or more hardware pipelines as described herein.

FIG. 6 is a table that describes various ping-pong buffers that may be included as part of one or more hardware pipelines as described herein.

FIG. 7 is a table that describes various first-in-first-out (FIFO) buffers that may be included as part of one or more hardware pipelines as described herein.

Figure 1:
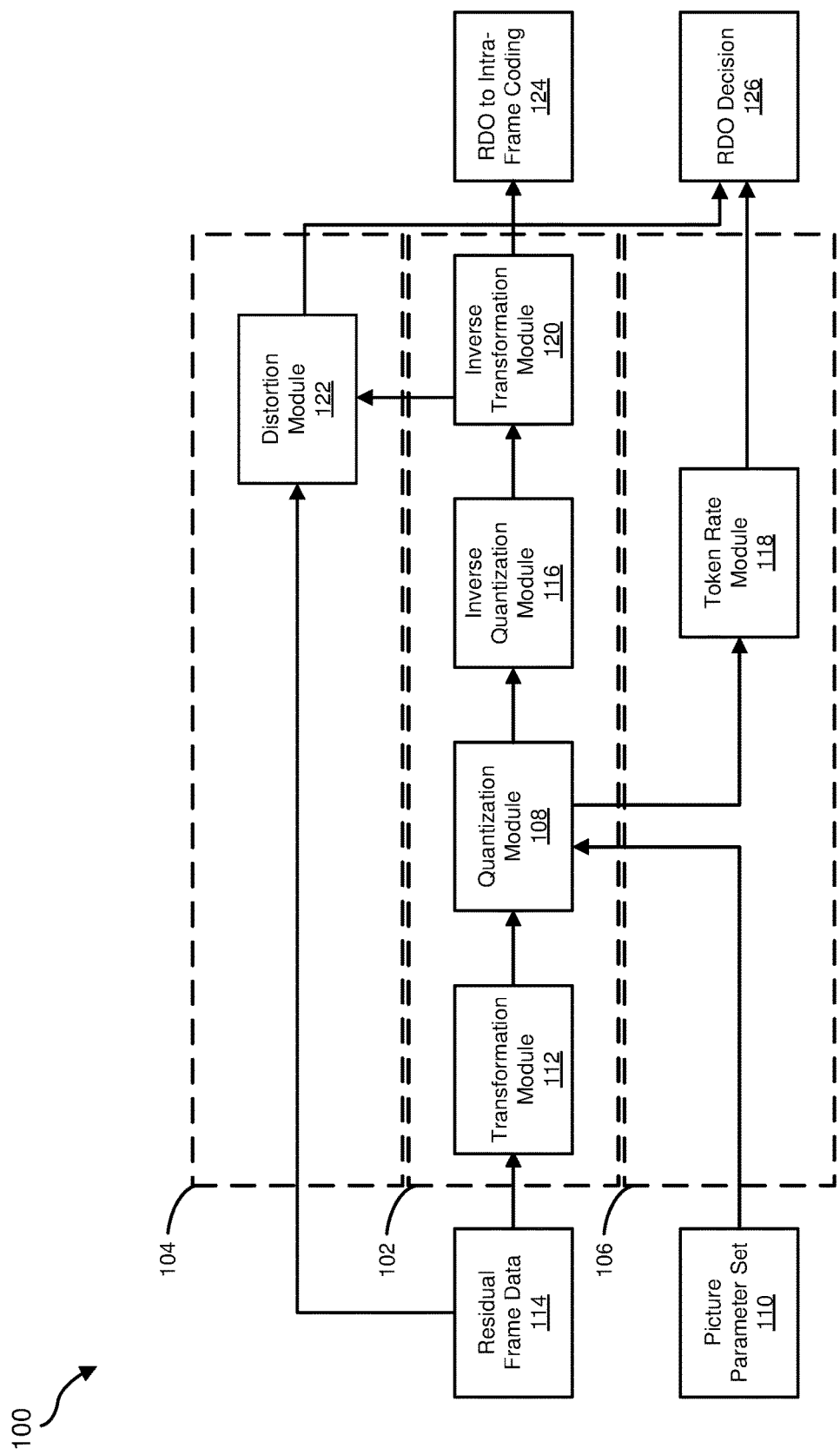
FIG. 1 is a block diagram of an example system that includes a hardware pipeline for rate-distortion optimization (RDO) that supports multiple codecs.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Modern video encoding standards, such as H.264/Advanced Video Coding (AVC) and VP9, are generally based on hybrid coding frameworks that may compress video data by exploiting redundancies within the video data. Compression may be achieved by identifying and storing only differences within the video data, such as may occur between temporally proximate frames (i.e., inter-frame coding) and/or between spatially proximate pixels (i.e., intra-frame coding). Inter-frame compression uses data from one or more earlier or later frames in a sequence to describe a current frame. Intra-frame coding, on the other hand, uses only data from within the current frame to describe the current frame.

Modern video encoding standards may additionally employ compression techniques like quantization that may exploit perceptual features of human vision, such as by eliminating, reducing, and/or more heavily compressing aspects of source video data that may be less relevant to human visual perception than other aspects. For example, as human vision may generally be more sensitive to changes in brightness than changes in color, a video encoder using a particular video codec may use more data to encode changes in luminance than changes in color. In all, video encoders must balance various trade-offs between video quality, bit rate, processing costs, and/or available system resources to effectively encode and/or decode video data.

Conventional or traditional methods of making encoding decisions may involve simply choosing a result that yields the highest quality output image according to some quality standard. However, such methods may choose settings that may require more bits to encode video data while providing comparatively little quality benefit. As an example, during a motion estimation portion of an encoding process, adding extra precision to representation of motion vectors of blocks might increase quality of an encoded output video, but the increase in quality might not be worth the extra bits necessary to encode the motion vectors with a higher precision.

As an additional example, during a basic encoding process, an encoder may divide each frame of video data into processing units. Depending on the codec, these processing units may be referred to as macroblocks (MB), coding units (CU) and/or coding tree units (CTU). Modern codecs may select a particular mode (i.e., a processing unit size and/or shape) from among several available modes for encoding video data. This mode decision may greatly impact an overall rate—distortion result for a particular output video file.

In order to determine or decide an optimal bit rate having an acceptable level of distortion, some modern codecs may use a technique called Lagrangian rate—distortion optimization. Rate—distortion optimization, also referred to as rate distortion optimized mode selection, or simply RDO, is a technique for choosing a coding mode of a macroblock based on a bitrate cost and distortion cost. In one expression, the bitrate cost R and distortion cost D may be combined into a single cost J:

$$J = D + \lambda R \qquad (1)$$

An RDO mode selection algorithm may attempt to find a mode that may optimize (e.g., minimize) the joint cost J. A trade-off between R and D may be controlled by Lagrange multiplier $\lambda$. A smaller $\lambda$ may emphasize minimizing D, allowing a higher bitrate, where a larger $\lambda$ may tend to minimize R at with an expense of a higher distortion. Selecting an optimum $\lambda$ for a particular sequence may be a computationally intense problem. In some examples, empirical approximations may provide an effective choice of $\lambda$ in a practical mode selection scenario. In some examples, $\lambda$ may be calculated as a function of a quantization parameter (QP).

Distortion (D) may be calculated as the Sum of Squared Distortion (SSD) in accordance with $$D_{SSD} = \sum_{x,y} (b(x, y) - b'^{(x,y)})^2 \qquad (2)$$

where x, y are sample positions within a block, b(x, y) are original sample values, and b'(x, y) are decoded sample values at each sample position. This is merely an example, however, as other distortion metrics, such as Sum of Absolute Differences (SAD) or Sum of Absolute Transformed Differences (SATD) may be used in these or related distortion calculations.

An RDO mode selection algorithm may involve, for every macroblock and for every available coding mode m, coding the macroblock using m and calculating R as a number of bits required to code the macroblock. The macroblock may be reconstructed and D, the distortion between the original and decoded macroblocks, may be determined. The mode cost $J_m$ may then be calculated, with a suitable choice of A. The mode that gives the minimum $J_m$ may then be identified and selected.

Clearly, the above is a computationally intensive process, as there may be hundreds of possible mode combinations. It may be necessary to code and decode a macroblock hundreds of times to find a "best" mode for optimizing rate versus distortion. Some systems may attempt to offload some of this high computational burden to specialized hardware. Unfortunately, different video codecs may support different modes and/or may employ different techniques for analyzing and/or encoding video data. Consequently, there may be a high cost of redundancy in such specialized RDO hardware, particularly when that specialized hardware may need to support multiple codecs. This redundancy may result in hardware complexity and high power usage. Hence, the instant application identifies and addresses a need for a power-efficient hardware pipeline for RDO that may support multiple different video codecs.

The present disclosure is generally directed to systems and methods for RDO that support multiple codecs. As will be explained in greater detail below, embodiments of the instant disclosure may include a hardware distortion data pipeline that includes a quantization module, an inverse quantization module, and an inverse transformation module. The quantization module may generate a quantized data set (Q) based on a picture parameter set (PPS) and a transformed (TX) data set, where the TX data set may include a residual frame data set that has been transformed in accordance with a transformation operation. The inverse quantization module may generate, from the Q data set, an inverse quantized (IQ) data set by executing an inverse quantization of the Q data set, and the inverse transformation module may generate an inversely transformed (ITX) data set by executing an inverse transformation of the IQ data set. Some example embodiments may also include a hardware determination pipeline that may determine a distortion metric based on the ITX data set and the residual frame data set and a hardware token rate pipeline that may determine, based on the Q data set, a token rate for an encoding of the residual frame data set via a video encoding pipeline.

By running a hardware RDO pipeline that includes a hardware token rate pipeline in parallel with a hardware distortion data pipeline, embodiments of the systems and methods described herein may smartly maintain a balanced performance of a video encoding pipeline while reducing overall power consumption. Furthermore, by supporting multiple codecs in a single RDO pipeline, embodiments of the systems and methods described herein may share input packaging and processing resources, thereby reducing redundancy in chip design and implementation.

The following will provide, with reference to FIGS. 1-2 and 4-7, detailed descriptions of systems for RDO optimization that supports multiple codecs. Detailed descriptions of corresponding computer-implemented methods will also be provided in connection with FIG. 3.

FIG. 1 is a block diagram of an example system 100 for a power-efficient hardware pipeline for RDO that supports multiple codecs. As illustrated in this figure, example system 100 may include a hardware distortion data pipeline 102, a hardware determination pipeline 104, and a hardware token rate pipeline 106. Each of these parallel pipelines may include various modules that may perform various functions within in an RDO workflow.

As further shown in FIG. 1, hardware distortion data pipeline 102 may include a quantization module 108 that may generate a quantized data set based on a picture parameter set 110 and a transformed data set, such as a transformed data set received from transformation module 112.

In some examples, a picture parameter set (PPS) (e.g., PPS 110) may include a syntax and/or data structure that may contain syntax and/or data elements that may apply to an entire coded picture. In some examples, a PPS may be included within one or more network abstraction layer (NAL) units. A PPS NAL unit may include and/or contain parameters that may apply to the decoding of one or more individual pictures inside a coded video sequence. The possible contents and/or syntax of a PPS may be defined within a suitable video encoding standard (e.g., H.264/AVC, HEVC, VP9, etc.). Furthermore, in some examples, a PPS may include one or more quantization parameters (QP) for quantization of transformed residual data.

As will be described in greater detail below, the transformed data set (also referred to herein as "TX") may include a residual frame data set (e.g., residual frame data 114) that has been transformed by transformation module in accordance with a transformation operation supported by a suitable video encoding process (e.g., H.264/AVC, VP9, etc.). In some examples, residual frame data 114 may include or represent a DCT difference between an input frame (e.g., a frame, a block, a macroblock, etc.) and an intra- or inter-predicted frame (e.g., a frame, a block, a macroblock, etc.).

In some examples, a transform operation executed by transformation module 112 may include a transform operation supported by a video encoding standard, such as an AVC/H.264 video encoding standard, a VP9 video encoding standard, and so forth.

By way of illustration, when the video encoding standard includes the AVC/H.264 video encoding standard, the transform operation may include a discrete cosine transform having dimensions of up to eight pixels by eight pixels, a four pixel by four pixel luma direct current (DC) transform, a two pixel by two pixel chroma DC transform, and/or any other suitable transform operation supported by the AVC/H.264 video encoding standard.

Additionally or alternatively, when the video encoding standard includes the VP9 video encoding standard, the transform operation may include a discrete cosine transform having dimensions of up to thirty-two pixels by thirty-two pixels, a discrete sine transform having dimensions of up to thirty-two pixels by thirty-two pixels, and/or any other suitable transform operation supported by the VP9 video encoding standard.

In a quantization operation, less complex (e.g., integer) values may be selected to represent this DCT difference. These less complex quantized values may be more readily compressed than the computed DCT difference. A quantization process or operation may be mathematically expressed as:

$$C[x] = \text{sign}(x) \times \max\left(0, \text{floor}\left(\frac{|x|}{s} + 1 - z\right)\right) \quad (3)$$

where x may represent an initial transformed residual value, C[x] may denote a quantized residual value, s may represent a quantization step (QStep) and z may represent rounding parameters. As human vision may not be sensitive to high-frequency components of a frame, according to the position of each transformed data, a quantizing process may apply a large quantization step s to such high-frequency components to reduce an overall bitrate of the encoded video stream.

Hence, quantization module 108 may generate, based on PPS 110 and a TX data set received from transformation module 112, a quantized (Q) data set. As shown in FIG. 1, this Q data set may be received by an inverse quantization module 116 within hardware distortion data pipeline 102 and a token rate module 118 that may be included as part of hardware token rate pipeline 106. Inverse quantization module 116 may generate an inversely quantized (IQ) data set by executing an inverse quantization of the Q data set, and inverse transformation module 120 may generate an inversely transformed (ITX) data set by executing an inverse transformation of the IQ data set. Distortion module 122, included as part of hardware distortion pipeline 104, may then receive the ITX data set and compare determines a distortion metric based on the ITX data set and determine a distortion metric based on the ITX data set and residual frame data 114. Likewise, the ITX data set may be passed from the RDO workflow to an intra-frame coding workflow at module 124.

Distortion module 122 may determine a distortion metric based on the ITX data set and the residual frame data set in any suitable way, using any suitable distortion metric that may measure a degree of deviation of the ITX data set from residual frame data 114. For example, distortion module 122 may determine a mean squared error (MSE) between the ITX data set and residual frame data 114. As other examples, distortion module 122 may determine a SSD, SAD, SATD, or other distortion metric. This determined distortion metric may be used by RDO decision module 126 to determine whether to adjust an encoding rate to optimize and/or reduce an amount of distortion in an encoded video stream or file.

As noted above, hardware token rate pipeline 106 may determine, via token rate module 118 and based on a Q data set (e.g., quantized data received from quantization module 108), a token rate for an encoding of residual frame data 114 via a video encoding pipeline (e.g., a video encoding pipeline that may include system 100). Token rate module 118 may determine the token rate in any suitable way. For example, as further noted above, a rate and/or a suitable A value may be calculated as a function of a QP, and various empirical approximations may be used to select A and/or determine a rate R based on a provided QP.

Token rate module 118 may determine a suitable token rate in different ways for different video encoding standards. For example, for an H.264/AVC video encoding standard, the token rate may be calculated via a series of look-up table checking. In conventional H.264 implementations, an encoder may access a single look-up table to find a suitable value for token rate calculation. In conventional VP9 implementation, an encoder may use multiple levels of look-up tables generated from an initial seed probability table.

However, in the present system, token rate module 118 may access and/or reference different pre-populated look-up tables depending on a size and/or type of transform unit (TU) sub block under consideration. As an illustration, for H.264/AVC, an intra4×4 block, inter4×4 block, intra8×8 block, and inter8×8 block may each use a different look-up table. These look-up tables may be pre-processed and stored within a suitable storage medium accessible to token rate module 118. In this way, token rate module 118 may access and/or reference a much smaller look-up table for each token rate calculation, which may tremendously reduce hardware resources and/or conserve electrical resources.

Figure 2:
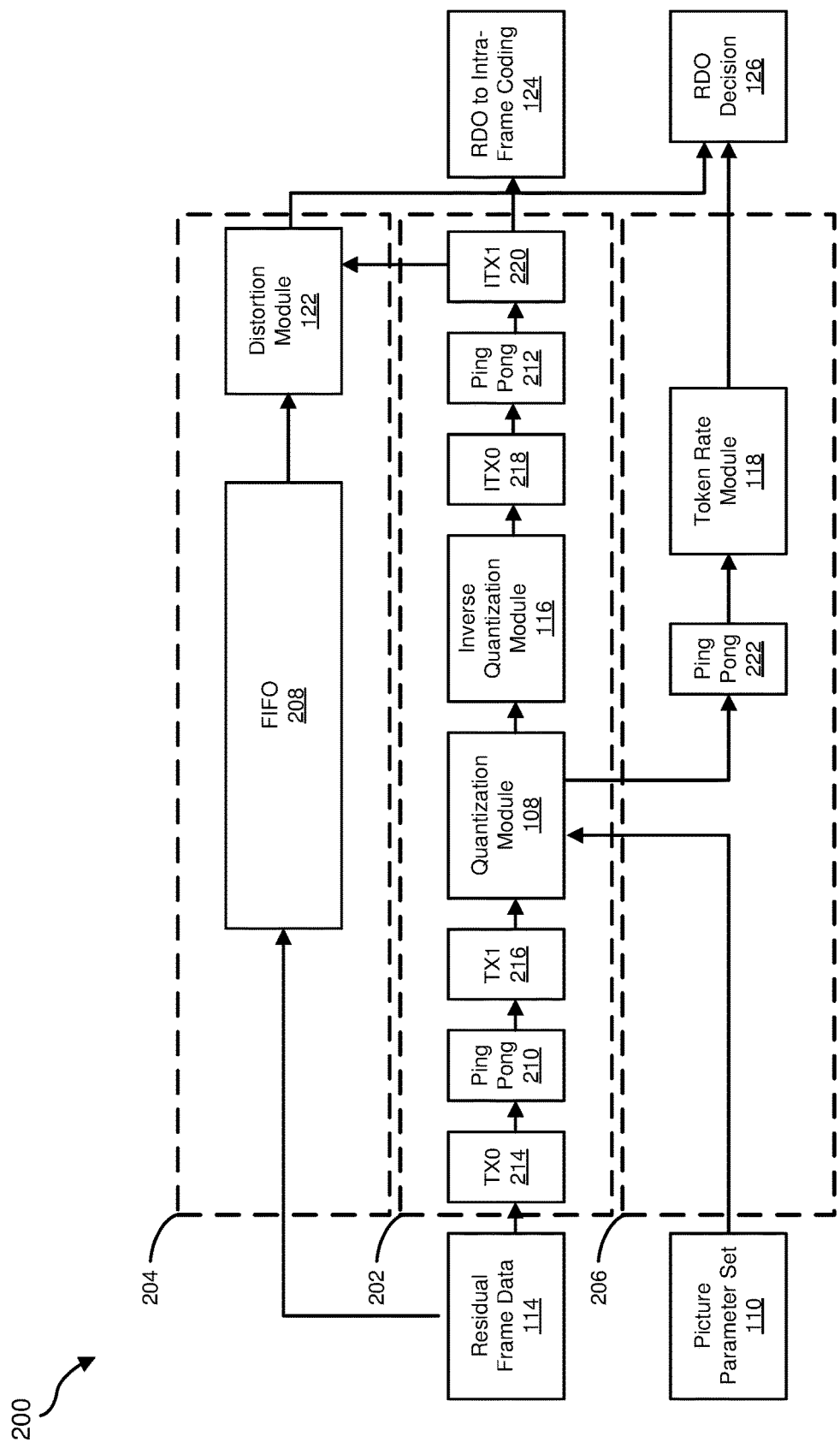
FIG. 2 is a block diagram of an additional example system that includes a hardware pipeline for RDO that supports multiple codecs.

In order to achieve some of the efficiencies and benefits described herein, some embodiments of the systems and methods described herein may include and/or employ various kinds, types, sizes, and so forth of memory buffers to store data before, during, and/or after processing. For example, FIG. 2 illustrates a block diagram of an additional example system 200 that includes a hardware pipeline for RDO that supports multiple codecs. As shown, system 200 includes a hardware distortion data pipeline 202, a hardware determination pipeline 204, and a hardware token rate pipeline 206. Each of these parallel pipelines may include various modules that may perform various functions within in an RDO workflow.

Example system 200 may include various components also present within example system 100. However, unlike hardware determination pipeline 104, hardware determination pipeline 204 may include a first-in-first-out (FIFO) buffer 208. In some examples, a FIFO buffer (e.g., FIFO buffer 208) may include any suitable hardware or software buffer that may receive and store a portion of a data set while a processor (e.g., a digital signal processor, a co-processor, a computing module, an FPU, etc.) processes the stored portion of the data set in a first-in, first-out fashion. Hence, if a FIFO buffer receives a first data set, followed by a second data set, a processor will process the first data set and/or clear the first data set from the FIFO buffer before processing the second data set and/or clearing the second data set from the FIFO buffer.

As shown in FIG. 2, hardware determination pipeline 204 may receive residual frame data 114 into FIFO buffer 208. FIFO buffer 208 may store and/or maintain residual frame data 114 until distortion module 122 may use it to determine a distortion metric. As FIFO buffer 208 may store data in a FIFO fashion, when distortion module 122 processes residual frame data 114, distortion module 122 may process a first portion of residual frame data 114 received into FIFO buffer 208 at a first time prior to processing a second portion of residual frame data 114 received into FIFO buffer 208 at a second time.

Continuing with FIG. 2, hardware distortion data pipeline 202 may include a ping-pong data buffer 210 and a ping-pong data buffer 212. In some examples, a ping-pong buffer or ping-pong data buffer (e.g., ping-pong buffer 210, ping-pong buffer 212, etc.) may include any suitable hardware or software buffer that may receive and store a portion of a data set while a processor (e.g., a digital signal processor, a co-processor, a computing module, an FPU, etc.) processes an additional portion of the data set. In some examples, a processor may process an initial data set stored in a first buffer while a secondary data set may load into a second buffer. When the processor completes processing the initial data set, the processor may begin processing the secondary data set from the second buffer. While the processor processes the secondary data set, a tertiary data set may load into the first buffer. When the processor completes processing the secondary data set from the second buffer, the processor may begin processing the tertiary data set from the first buffer. While the processor processes the tertiary data set from the first buffer, a quaternary data set may load into the second buffer. This may continue indefinitely, or until the processor has processed all available data sets.

Hence, as shown in FIG. 2, hardware distortion data pipeline 202 may receive a first portion of residual frame data 114 into ping-pong data buffer 210. Although not shown in FIG. 2, hardware distortion data pipeline 202 may include one or more transformation modules (e.g., transformation module 112). One or more of these transformation modules (e.g., transformation module 112) may generate a first portion of the TX data set (e.g., TX0 214) by accessing the first portion of residual frame data set 114 from ping-pong buffer 210. While the transformation module generates the first portion of the TX data set, the transformation module (e.g., transformation module 112) may load and/or receive a second portion of residual frame data set 114 into ping-pong data buffer 210. The transformation module may then generate a second portion of the TX data set (e.g., TX1 216) by accessing the second portion of residual frame data set 114 from ping-pong data buffer 210.

Likewise, inverse quantization module 116 may store a first portion of the IQ data set in ping-pong data buffer 212. Although not shown in FIG. 2, hardware distortion data pipeline 202 may include one or more inverse transformation modules (e.g., inverse transformation module 120). One or more of these inverse transformation modules (e.g., inverse transformation module 120) may generate a first portion of the ITX data set (e.g., ITX0 214) by accessing the first portion of the IQ data set from ping-pong buffer 212. While the inverse transformation module generates the first portion of the ITX data set, inverse quantization module 116 and/or the inverse transformation module (e.g., inverse transformation module 120) may load and/or receive a second portion of the IQ data set into ping-pong data buffer 220. The inverse transformation module may then generate a second portion of the ITX data set (e.g., ITX1 220) by accessing the second portion of residual frame data set 114 from ping-pong data buffer 210.

Furthermore, quantization module 108 and/or token rate module 118 may store a first portion of the Q data set in ping-pong data buffer 222. Token rate module 118 may determine, as part of hardware token rate pipeline 206, a token rate for the first portion of the Q data set by accessing the first portion of the Q data set from ping-pong data buffer 222. While token rate module 118 determines the token rate for the first portion of the Q data set, quantization module 108 and/or token rate module 118 may load and/or receive a second portion of the IQ data set into ping-pong data buffer 222. Token rate module 118 may then determine a token rate for a second portion of the Q data set by accessing the second portion of the Q data set from ping-pong data buffer 222. Token rate module 118 may then determine an overall token rate for the Q data set based on the token rate for the first portion of the Q data set and the token rate for the second portion of the Q data set.

Various configurations of FIFO data buffers and/or ping-pong data buffers may facilitate synchronization and/or coordination between and among operations performed by hardware distortion data pipeline 202, hardware determination pipeline 204, and hardware token rate pipeline 206. Hence, many of the benefits of the systems and methods described herein may be accomplished through the use of various suitable buffer configurations. However, particular configurations illustrated and/or described herein are provided by way of example only and do not limit the scope of this disclosure.

In some examples, each of the pipelines described herein may operate within a predetermined bandwidth requirement. The predetermined bandwidth requirement may be based on a predetermined partition size of the residual frame data set. For example, when residual frame data set 114 includes frame data at eight bits per pixel, the predetermined bandwidth requirement may be sixteen pixels per cycle when the partition size is up to eight pixels by eight pixels. Likewise, when the partition size is more than eight pixels by eight pixels, the bandwidth requirement may be thirty-two pixels per cycle.

FIG. 3 is a flow diagram of an example computer-implemented method 300 for RDO via a hardware pipeline as described herein. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which are provided herein.

As illustrated in FIG. 3, at step 310, one or more of the systems described herein may generate, within a distortion data pipeline, a quantized data set based on a picture parameter set and a transformed data set, the transformed data set comprising a residual frame data set that has been transformed in accordance with a transformation operation. For example, as described above, quantization module 108 may generate, within hardware distortion data pipeline 102 and/or hardware distortion data pipeline 202, a quantized data set based on PPS 110 and a transformed data set (e.g., TX0 214 and/or TX1 216), where the transformed data set has been transformed (e.g., by transformation module 112) in accordance with a transformation operation (e.g., a transformation operation supported by a suitable video encoding standard).

At step 320, one or more of the systems described herein may generate, within the distortion data pipeline, an inverse quantized data set by executing an inverse quantization of the quantized data set. For example, as described above, inverse quantization module 116 may generate, within hardware distortion data pipeline 102 and/or hardware distortion data pipeline 202, an inverse quantized data set by executing an inverse quantization of the quantized data set (e.g., the quantized data set generated by quantization module 108).

At step 330, one or more of the systems described herein may generate, within the distortion data pipeline, an inversely transformed data set by executing an inverse transformation of the inverse quantized data set. For example, as described above, inverse transformation module 120 may generate, within hardware distortion data pipeline 102 and/or hardware distortion data pipeline 202, an inversely transformed data set (e.g., ITX0 218 and/or ITX1 220) by executing an inverse transformation of the inverse quantized data set (e.g., the inverse quantized data set generated by inverse quantization module 116).

At step 340, one or more of the systems described herein may determine, within a determination pipeline, a distortion metric based on the inversely transformed data set and the residual frame data set. For example, as described above, distortion module 122 may determine, within hardware determination pipeline 104 and/or hardware determination pipeline 206, a distortion metric based on an inversely transformed data set (e.g., ITX0 218 and/or ITX1 220) and residual frame data set 114.

At step 350, one or more of the systems described herein may determine, within a token rate pipeline, based on the quantized data set, a token rate for an encoding of video data via a video encoding pipeline. For example, as described above, token rate module 118 may determine, within hardware token rate pipeline 106 and/or hardware token rate pipeline 206, based on a quantized data set received from quantization module 108, a token rate for an encoding of video data via a video encoding pipeline. Hence, an RDO decision may be based on the distortion metric determined by distortion module 122 and the token rate determined by token rate module 118.

FIGS. 4-7 include tables that may describe and/or illustrate various technical capabilities of one or more components of one or more of the hardware pipelines described herein. Note that all values and/or figures provided herein are provided for illustrative and/or example purposes only and are not intended to limit the scope of this disclosure in any way.

FIG. 4 includes a table 400 that may describe various transform partition sizes and operations that may be included as part of one or more hardware pipelines as described herein. As shown, a transformation module (e.g., transformation module 112) may support, for inter-prediction and/or intra-prediction via an H.264/AVC video encoding standard and/or a VP9 video encoding standard, various partition sizes and/or discrete cosine transform block sizes. Furthermore, in some examples, a transformation module may support, for intra-prediction via a VP9 video encoding standard, discrete sine transforms having various block sizes.

FIG. 5 includes a table 500 that may describe various inverse transform partition sizes and operations that may be included as part of one or more hardware pipelines as described herein. As shown, an inverse transformation module (e.g., inverse transformation module 120) may support, for inter-prediction and/or intra-prediction via an H.264/AVC video encoding standard and/or a VP9 video encoding standard, various partition sizes and/or inverse discrete cosine transform block sizes. Furthermore, in some examples, an inverse transformation module may support, for intra-prediction via a VP9 video encoding standard, inverse discrete sine transforms having various block sizes.

FIG. 6 includes a table 600 that may describe various ping-pong buffers that may be included as part of one or more hardware pipelines as described herein. As shown, one or more of the ping-pong buffers as described herein may support, for inter-prediction and/or intra-prediction via an H.264/AVC video encoding standard and/or a VP9 video encoding standard, various partition sizes and/or numbers of pixel values.

FIG. 7 includes a table 700 that may describe various first-in-first-out (FIFO) buffers that may be included as part of one or more hardware pipelines as described herein. As shown, one or more of the FIFO buffers described herein may support, for inter-prediction and/or intra-prediction via an H.264/AVC video encoding standard and/or a VP9 video encoding standard, various partition sizes and/or numbers of pixel values.

As discussed throughout the instant disclosure, the disclosed systems and methods may provide one or more advantages over traditional options for RDO. For example, by running a hardware RDO pipeline that includes hardware token rate pipeline in parallel with a hardware distortion data pipeline, embodiments of the systems and methods described herein may maintain a balanced performance of a video encoding pipeline while reducing overall power consumption. Furthermore, by supporting multiple codecs in a single RDO pipeline, embodiments of the systems and methods described herein may share input packaging and processing resources, thereby reducing redundancy in chip design and implementation.

EXAMPLE EMBODIMENTS

Example 1: A system comprising (1) a hardware distortion data pipeline comprising (A) a quantization module that generates a quantized (Q) data set based on a picture parameter set (PPS) and a transformed (TX) data set, the TX data set comprising a residual frame data set that has been transformed in accordance with a transformation operation, (B) an inverse quantization module that generates, from the Q data set, an inverse quantized (IQ) data set by executing an inverse quantization of the Q data set, (C) an inverse transformation module that generates an inversely transformed (ITX) data set by executing an inverse transformation of the IQ data set, (2) a hardware determination pipeline that determines a distortion metric based on the ITX data set and the residual frame data set, and (3) a hardware token rate pipeline that determines, based on the Q data set, a token rate for an encoding of the residual frame data set via a video encoding pipeline.

Example 2: The system of example 1, wherein the hardware distortion data pipeline, the hardware determination pipeline, and the hardware token rate pipeline operate in parallel to one another.

Example 3: The system of any of examples 1 and 2, wherein the hardware distortion data pipeline further comprises a transformation module that generates the transformed (TX) data set by transforming the residual frame data set in accordance with the transformation operation.

Example 4: The system of example 3, wherein the transformation module generates the TX data set by (1) receiving a first portion of the residual frame data set into a ping-pong data buffer, (2) generating a first (TX0) portion of the TX data set by accessing the first portion of the residual frame data set from the ping-pong data buffer, (3) while generating the TX0 portion of the TX data set, receiving a second portion of the residual frame data set into the ping-pong data buffer, and (4) generating a second (TX1) portion of the TX data set by accessing the second portion of the residual frame data set from the ping-pong data buffer.

Example 5: The system of any of examples 1-4, wherein the hardware determination pipeline comprises (1) a first-in-first-out (FIFO) buffer that receives the residual frame data in parallel with the transformation module, and (2) a determination module that accesses, for the determination of the distortion metric, the residual frame data from the FIFO buffer.

Example 6: The system of any of examples 1-5, wherein the hardware token rate pipeline comprises (1) a ping-pong buffer that receives at least a portion of the Q data set from the quantization module, and (2) a token rate module that determines the token rate for the encoding of the residual frame data set via the video encoding pipeline by accessing the portion of the Q data set from the ping-pong buffer.

Example 7: The system of any of examples 1-6, wherein each of the hardware distortion data pipeline and the hardware token rate pipeline operates within a predetermined bandwidth requirement based on a predetermined partition size of the residual frame data set.

Example 8: The system of example 7, wherein the predetermined bandwidth requirement comprises, at eight bits per pixel (1) sixteen pixels per cycle when the predetermined partition size comprises up to eight pixels by eight pixels, and (2) thirty—two pixels per cycle when the predetermined partition size comprises more than eight pixels by eight pixels.

Example 9: The system of any of examples 1-8, wherein the transform operation comprises a transform operation supported by a video encoding standard.

Example 10: The system of example 9, wherein the video encoding standard comprises at least one of (1) an Advanced Video Coding (AVC/H.264) video encoding standard, or (2) a VP9 video encoding standard.

Example 11: The system of example 10, wherein, when the video encoding standard comprises the AVC/H.264 video encoding standard, the transform operation supported by the video encoding standard comprises at least one of (1) a discrete cosine transform having dimensions of up to eight pixels by eight pixels, (2) a four pixel by four pixel luma direct current (DC) transform, or (3) a two pixel by two pixel chroma DC transform.

Example 12: The system of any of examples 10 and 11, wherein, when the video encoding standard comprises the VP9 video encoding standard, the transform operation supported by the video encoding standard comprises at least one of (1) a discrete cosine transform having dimensions of up to thirty-two pixels by thirty-two pixels, or (2) a discrete sine transform having dimensions of up to thirty-two pixels by thirty-two pixels.

Example 13: A computer-implemented method comprising (1) generating, within a distortion data pipeline (A) a quantized (Q) data set based on a picture parameter set (PPS) and a transformed (TX) data set, the TX data set comprising a residual frame data set that has been transformed in accordance with a transformation operation, (B) an inverse quantized (IQ) data set by executing an inverse quantization of the Q data set, and (C) an inversely transformed (ITX) data set by executing an inverse transformation of the IQ data set, (2) determining, within a determination pipeline, a distortion metric based on the ITX data set and the residual frame data set, and (3) determining, within a token rate pipeline, based on the Q data set, a token rate for an encoding of video data via a video encoding pipeline.

Example 14: The computer-implemented method of example 13, further comprising generating, within the distortion data pipeline, the transformed (TX) data set by transforming the residual frame data set in accordance with the transformation operation.

Example 15: The computer-implemented method of example 14, wherein transforming the residual frame data set in accordance with the transformation operation comprises (1) receiving a first portion of the residual frame data set into a ping-pong data buffer, (2) generating a first (TX0) portion of the TX data set by accessing the first portion of the residual frame data set from the ping-pong data buffer, (3) while generating the TX0 portion of the TX data set, receiving a second portion of the residual frame data set into the ping-pong data buffer, and (4) generating a second (TX1) portion of the TX data set by accessing the second portion of the residual frame data set from the ping-pong data buffer.

Example 16: The computer-implemented method of any of examples 13-15, further comprising (1) receiving the residual frame data into a first-in-first-out (FIFO) buffer included in the determination pipeline, and (2) accessing, for the determination of the distortion metric, the residual frame data from the FIFO buffer.

Example 17: The computer-implemented method of any of examples 13-16, further comprising (1) receiving, into a ping-pong buffer included in the token rate pipeline, at least a portion of the Q data set, and (2) determining the token rate for the encoding of the residual frame data set via the video encoding pipeline by accessing the portion of the Q data set from the ping-pong buffer.

Example 18: The computer-implemented method of any of examples 13-17, wherein the transform operation comprises a transform operation supported by a video encoding standard.

Example 19: The computer-implemented method of example 18, wherein the video encoding standard comprises at least one of (1) an Advanced Video Coding (AVC/H.264) video encoding standard, or (2) a VP9 video encoding standard.

Example 20: A non-transitory computer-readable medium comprising computer-readable instructions that, when executed by at least one processor of a computing system, cause the computing system to (1) generate, within a distortion data pipeline (A) a quantized (Q) data set based on a picture parameter set (PPS) and a transformed (TX) data set, the TX data set comprising a residual frame data set that has been transformed in accordance with a transformation operation, (B) an inverse quantized (IQ) data set by executing an inverse quantization of the Q data set, and (C) an inversely transformed (ITX) data set by executing an inverse transformation of the IQ data set, (2) determine, within a determination pipeline, a distortion metric based on the ITX data set and the residual frame data set, and (3) determine, within a token rate pipeline, based on the Q data set, a token rate for an encoding of video data via a video encoding pipeline.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive residual frame data to be transformed, transform the residual frame data, output a result of the transformation to perform an RDO function, use the result of the transformation to compress video data, and store the result of the transformation to compress additional video data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The terms "processor" or "physical processor," as used herein, generally refers to or represents any type or form of hardware-implemented processing unit capable of interpreting and/or executing computer-readable instructions. In one example, a physical processor may access and/or modify one or more of the modules described herein. Additionally or alternatively, a physical processor may execute one or more of the modules described herein to facilitate one or more RDO processes. Examples of a physical processor include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

The term "memory," as used herein, generally refers to or represents any type or form of volatile or non-volatile storage device or medium capable of storing data and/or computer-readable instructions. In one example, one or more memory devices may store, load, and/or maintain one or more of the modules described herein. Examples of memory or memory devices may include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system comprising:
    a hardware distortion data pipeline comprising:
        a transformation module that generates a transformed (TX) data set in accordance with a transformation operation by:
            receiving a first portion of a residual frame data set into a ping-pong data buffer;
            generating a first (TX0) portion of the TX data set by accessing the first portion of the residual frame data set from the ping-pong data buffer;
            while generating the TX0 portion of the TX data set, receiving a second portion of the residual frame data set into the ping-pong data buffer; and
            generating a second (TX1) portion of the TX data set by accessing the second portion of the residual frame data set from the ping-pong data buffer;
        a quantization module that generates a quantized (Q) data set based on a picture parameter set (PPS) and the transformed (TX) data set;
        an inverse quantization module that generates, from the Q data set, an inverse quantized (IQ) data set by executing an inverse quantization of the Q data set; and
        an inverse transformation module that generates an inversely transformed (ITX) data set by executing an inverse transformation of the IQ data set;
    a hardware determination pipeline that determines a distortion metric based on the ITX data set and the residual frame data set; and
    a hardware token rate pipeline that determines, based on the Q data set, a token rate for an encoding of the residual frame data set via a video encoding pipeline.

2. The system of claim 1, wherein the hardware distortion data pipeline, the hardware determination pipeline, and the hardware token rate pipeline operate in parallel to one another.

3. The system of claim 1, wherein the hardware determination pipeline comprises:
    a first-in-first-out (FIFO) buffer that receives the residual frame data in parallel with the transformation module; and
    a determination module that accesses, for the determination of the distortion metric, the residual frame data from the FIFO buffer.

4. The system of claim 1, wherein the hardware token rate pipeline comprises:
    an additional ping-pong buffer that receives at least a portion of the Q data set from the quantization module; and
    a token rate module that determines the token rate for the encoding of the residual frame data set via the video encoding pipeline by accessing the portion of the Q data set from the additional ping-pong buffer.

5. The system of claim 1, wherein each of the hardware distortion data pipeline and the hardware token rate pipeline operates within a predetermined bandwidth requirement based on a predetermined partition size of the residual frame data set.

6. The system of claim 5, wherein the predetermined bandwidth requirement comprises, at eight bits per pixel:

sixteen pixels per cycle when the predetermined partition size comprises up to eight pixels by eight pixels; and thirty-two pixels per cycle when the predetermined partition size comprises more than eight pixels by eight pixels.

7. The system of claim 1, wherein the transform operation comprises a transform operation supported by a video encoding standard.

8. The system of claim 7, wherein the video encoding standard comprises at least one of:
an Advanced Video Coding (AVC/H.264) video encoding standard; or
a VP9 video encoding standard.

9. The system of claim 8, wherein, when the video encoding standard comprises the AVC/H.264 video encoding standard, the transform operation supported by the video encoding standard comprises at least one of:
a discrete cosine transform having dimensions of up to eight pixels by eight pixels;
a four pixel by four pixel luma direct current (DC) transform; or
a two pixel by two pixel chroma DC transform.

10. The system of claim 8, wherein, when the video encoding standard comprises the VP9 video encoding standard, the transform operation supported by the video encoding standard comprises at least one of:
a discrete cosine transform having dimensions of up to thirty-two pixels by thirty-two pixels; or
a discrete sine transform having dimensions of up to thirty-two pixels by thirty-two pixels.

11. A computer-implemented method comprising:
generating, within a hardware distortion data pipeline:
a transformed (TX) data set by transforming a residual frame data set in accordance with a transformation operation by:
receiving a first portion of the residual frame data set into a ping-pong data buffer;
generating a first (TX0) portion of the TX data set by accessing the first portion of the residual frame data set from the ping-pong data buffer;
while generating the TX0 portion of the TX data set, receiving a second portion of the residual frame data set into the ping-pong data buffer; and
generating a second (TX1) portion of the TX data set by accessing the second portion of the residual frame data set from the ping-pong data buffer;
a quantized (Q) data set based on a picture parameter set (PPS) and the transformed (TX) data set;
an inverse quantized (IQ) data set by executing an inverse quantization of the Q data set; and
an inversely transformed (ITX) data set by executing an inverse transformation of the IQ data set;
determining, within a hardware determination pipeline, a distortion metric based on the ITX data set and the residual frame data set; and
determining, within a hardware token rate pipeline, based on the Q data set, a token rate for an encoding of video data via a video encoding pipeline.

12. The computer-implemented method of claim 11, further comprising:
receiving the residual frame data into a first-in-first-out (FIFO) buffer included in the determination pipeline; and
accessing, for the determination of the distortion metric, the residual frame data from the FIFO buffer.

13. The computer-implemented method of claim 11, further comprising:
receiving, into an additional ping-pong buffer included in the hardware token rate pipeline, at least a portion of the Q data set; and
determining the token rate for the encoding of the residual frame data set via the video encoding pipeline by accessing the portion of the Q data set from the additional ping-pong buffer.

14. The computer-implemented method of claim 11, wherein the transform operation comprises a transform operation supported by a video encoding standard.

15. The computer-implemented method of claim 14, wherein the video encoding standard comprises at least one of:
an Advanced Video Coding (AVC/H.264) video encoding standard; or
a VP9 video encoding standard.

16. A non-transitory computer-readable medium comprising computer-readable instructions that, when executed by at least one processor of a computing system, cause the computing system to:
generate, within a hardware distortion data pipeline:
a transformed (TX) data set in accordance with a transformation operation by:
receiving a first portion of a residual frame data set into a ping-pong data buffer;
generating a first (TX0) portion of the TX data set by accessing the first portion of the residual frame data set from the ping-pong data buffer;
while generating the TX0 portion of the TX data set, receiving a second portion of the residual frame data set into the ping-pong data buffer; and
generating a second (TX1) portion of the TX data set by accessing the second portion of the residual frame data set from the ping-pong data buffer;
a quantized (Q) data set based on a picture parameter set (PPS) and the transformed (TX) data set;
an inverse quantized (IQ) data set by executing an inverse quantization of the Q data set; and
an inversely transformed (ITX) data set by executing an inverse transformation of the IQ data set;
determine, within a hardware determination pipeline, a distortion metric based on the ITX data set and the residual frame data set; and
determine, within a hardware token rate pipeline, based on the Q data set, a token rate for an encoding of video data via a video encoding pipeline.

17. The non-transitory computer-readable medium of claim 16, wherein the non-transitory computer-readable medium further comprises computer-readable instructions that, when executed by the at least one processor, cause the computing system to further:
receive the residual frame data into a first-in-first-out (FIFO) buffer included in the hardware determination pipeline; and
access, for the determination of the distortion metric, the residual frame data from the FIFO buffer.

18. The non-transitory computer-readable medium of claim 16, wherein the non-transitory computer-readable medium further comprises computer-readable instructions that, when executed by the at least one processor, cause the computing system to further:
receive, into an additional ping-pong buffer included in the hardware token rate pipeline, at least a portion of the Q data set; and
determine the token rate for the encoding of the residual frame data set via the video encoding pipeline by accessing the portion of the Q data set from the additional ping-pong buffer.

19. The non-transitory computer-readable medium of claim 16, wherein the non-transitory computer-readable medium further comprises computer-readable instructions that, when executed by the at least one processor, cause the hardware distortion data pipeline, the hardware determination pipeline, and the hardware token rate pipeline to operate in parallel to one another.

20. The non-transitory computer-readable medium of claim 16, wherein the non-transitory computer-readable medium further comprises computer-readable instructions that, when executed by the at least one processor, cause each of the hardware distortion data pipeline and the hardware token rate pipeline to operate within a predetermined bandwidth requirement based on a predetermined partition size of the residual frame data set.

* * * * *